UNITED STATES PATENT OFFICE.

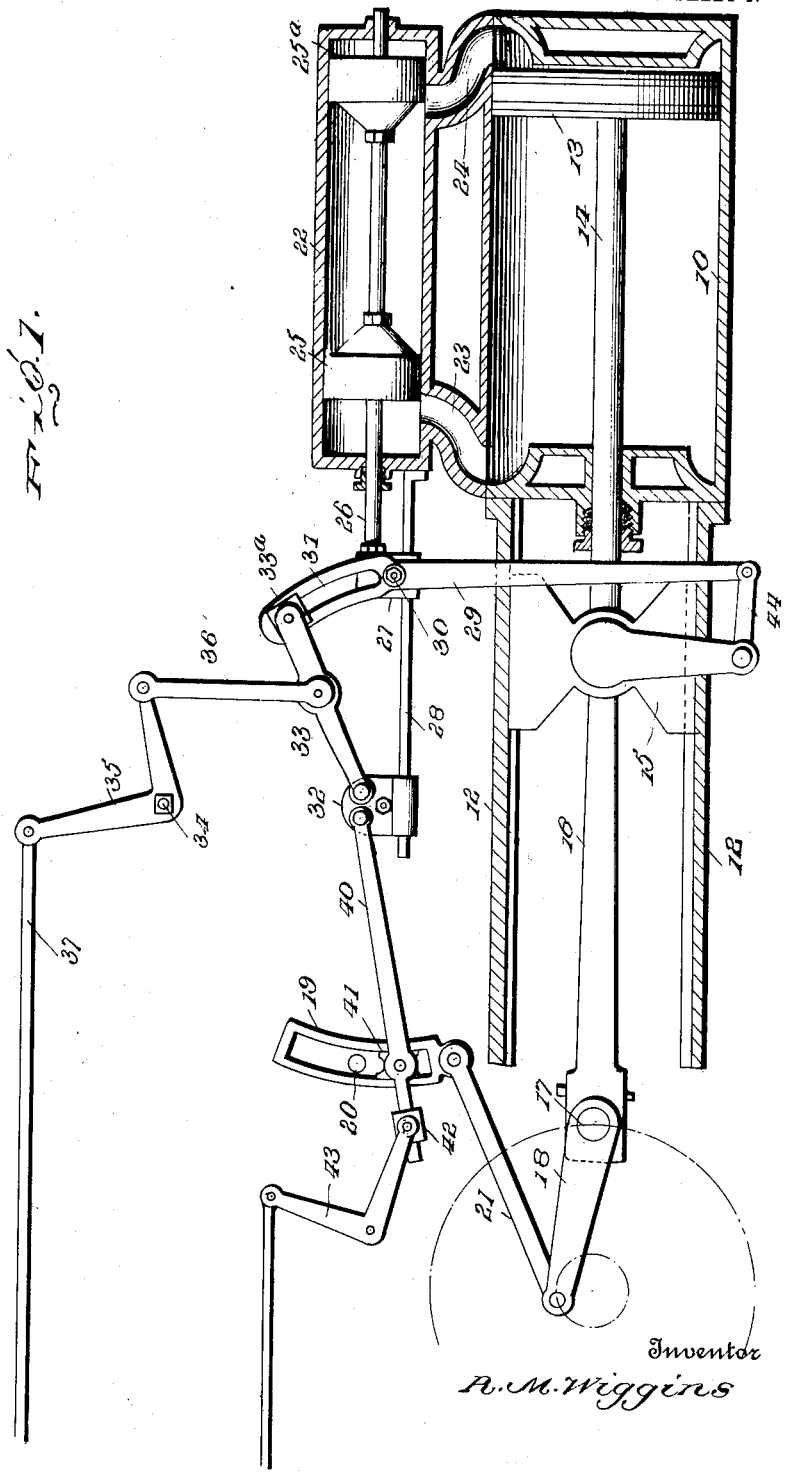

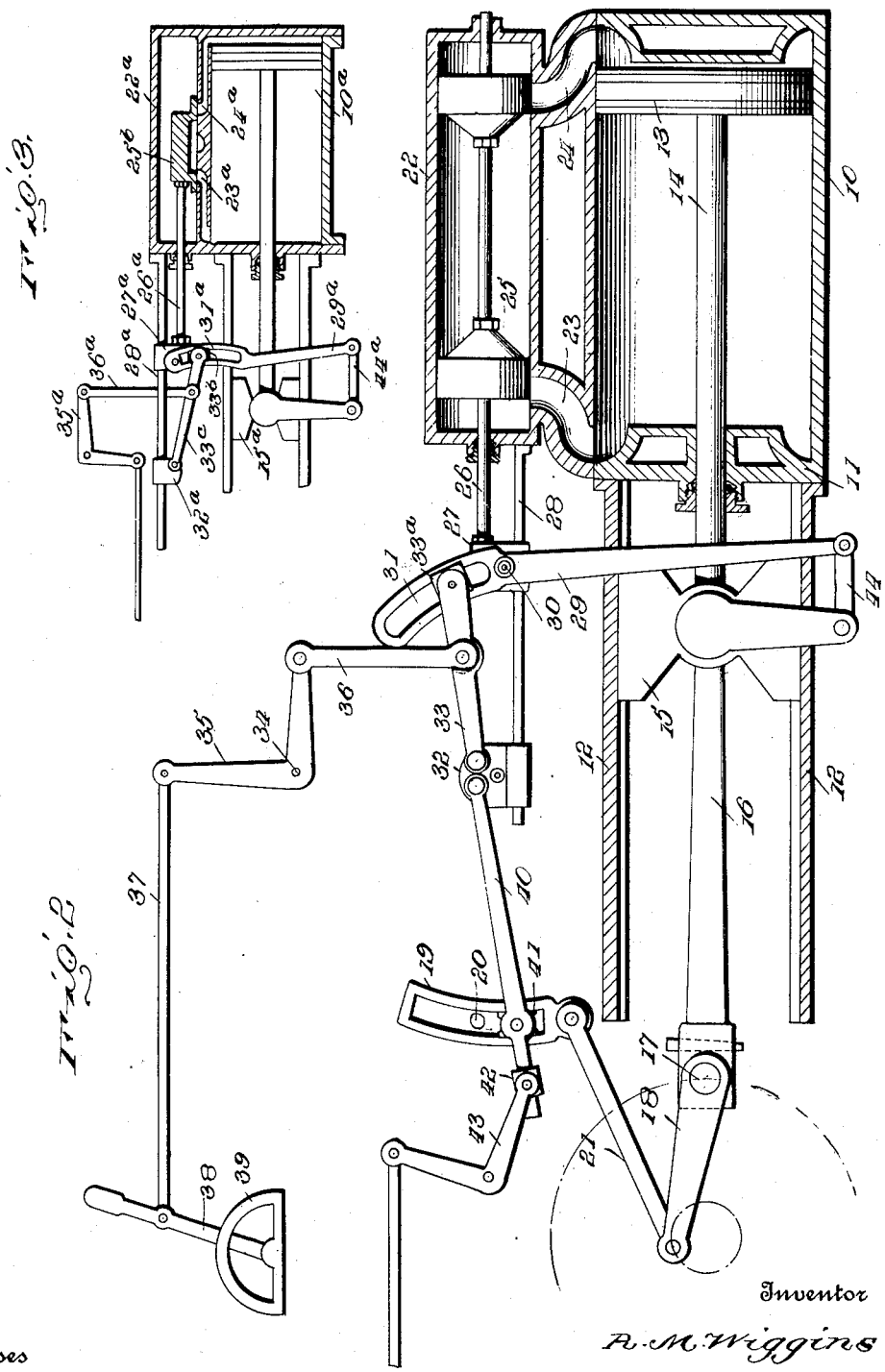

RICHARD M. WIGGINS, OF TRENTON, MISSOURI, ASSIGNOR OF ONE-HALF TO E. R. SHEETZ, OF TRENTON, MISSOURI.

LEAD-CONTROLLER FOR VALVE-GEAR.

1,025,175.  Specification of Letters Patent.  Patented May 7, 1912.

Application filed November 1, 1910. Serial No. 590,193.

*To all whom it may concern:*

Be it known that I, RICHARD M. WIGGINS, citizen of the United States, residing at Trenton, in the county of Grundy and State of Missouri, have invented certain new and useful Improvements in Lead-Controllers for Valve-Gears, of which the following is a specification.

This invention relates to steam engine valve gearing of the radial type, and has particular reference to an improvement upon the Walschaert gear.

An object of this invention is to provide an attachment to radial gears, particularly to the Walschaert gear, whereby the lead may be controlled to increase or decrease the same, as desired, instead of maintaining a constant lead as in the structures now employed.

The invention has for another object to provide a radial gear of this type with a lead-controller adapted to increase and decrease the lead of the valves to correspond to the rate of speed at which the engine is driven.

A further object of this invention is to provide a valve gear with a lead-controller operable from the locomotive cab, or from a convenient distance from the valve gear, which does not necessitate the provision of additional valves and consequent extra valve gear, but which forms a simple attachment to the mechanism now commonly employed.

A further object of the invention is to produce a valve gear in the employment of which a better distribution, and hence a more economical consumption of steam is produced, thereby reducing the quantity of fuel and water otherwise required.

For a full understanding of the invention reference is to be had to the following description and accompanying drawing, in which:—

Figure 1 is a side elevation partly in section of the improved gear adjusted to increase the lead. Fig. 2 is a similar view disclosing the valves "line in line," or completely closing the admission port. Fig. 3 is a detail sectional view of a slight modification of the improved valve mechanism applied to a D-slide valve.

Corresponding and like parts are referred to in the following description and indicated in all the views of the accompanying drawings by the same reference characters.

Referring to the drawings the numeral 10 designates a cylinder of common form having a head 11 on the crank end thereof carrying the outwardly extending guides 12. A piston 13 is disposed within the cylinder 10 and is provided with a piston rod 14 projecting outwardly through the head 11. The guides 12 carry a cross-head 15 which is attached to the outer end of the piston rod 14 and to which is hinged one end of a connecting rod 16. The opposite end of the connecting rod 16 is carried upon a crank-pin 17 in the usual manner. Keyed upon the crank-pin 17 is an eccentric arm 18 extending toward the center of rotation of the crank-pin 17 and terminating at one side of the same as is disclosed to advantage in Figs. 1 and 2 of the drawings.

A reversing link 19 is mounted upon a saddle pin 20 at a point above and adjacent to the outer ends of the guides 12. The link 19 is rocked upon the saddle pin 20 at a point above and adjacent to the outer ends of the guides 12. The link 19 is rocked upon the saddle pin 20 by a connecting rod 21 which is hinged at its opposite ends respectively upon the lower end of the link 19 and the inner end of the eccentric arm 18.

The cylinder 10 is further provided, preferably upon its upper side, with a steam-chest 22 communicating with the cylinder 10 through the ports 23 and 24 located respectively adjacent to the crank and head ends of the cylinder. Spaced piston valves 25 and 25ª are disposed in the steam-chest 22 to regulate the passage of steam through the ports 23 and 24. A valve-rod 26 extends from the valves 25 and 25ª through the crank end of the valve-chest 22 and is secured at its outer extremity to a sliding head 27 mounted upon a guide-rod 28 carried by the steam-chest 22. The guide-rod 28 is preferably of circular form and adapted for passage through a corresponding opening formed in the lower end of the head 27. A floating lever 29 is hinged upon the sliding head 27 by a pin 30, engaging through the lever 29 at a point adjacent to its upper end. The floating lever 29 is formed with an arcuate and longitudinally slotted portion 31 upon its upper end above the pin 30 to form a fixed link thereon. A connecting head 32 is slidably mounted upon the guide 28 adjacent to its outer end, and hingedly carries the inner end of a radius blade 33 extending toward the fixed link 31 of the lever 29. A sliding block 33ᵃ is mounted in the arcuate recess of the link 31 and is attached to the outer end of the radius blade 33. A rocker shaft 34 is journaled above the connecting head 32 and carries a bell-crank lever 35 having the horizontal arm thereof connected to the radius blade 33 by a hanger 36. The vertical arm of the bell-crank lever 35 is provided with a reach-rod 37 to which is attached a hand-lever 38 coöperating with a quadrant 39 to adjust and to hold the bell-crank lever 35 in various positions. The connecting head 32 also hingedly carries a radius rod 40 pivotally carrying adjacent to its outer end a sliding block 41 arranged within the link 19. A sleeve 42 is slidably disposed upon the outer end of the radius rod 40 and is attached to the horizontal arm of a bell-crank lever 43 adapted to slide the block 41 to the opposite sides of the saddle-pin 20.

The lower end of the floating lever 29 is connected to the cross-head 15 by a link 44 to swing the lower end of the floating lever in operating the valve-gear.

The operation of the valve mechanism is well-known wherein the eccentric arm moves in a circular path as indicated by the dotted line passing through its outer end to act in the capacity of an eccentric vibrating rod 21. The rod 21 swings the link 19 about the saddle-pin 20 to impart a longitudinal reciprocating movement to the radius rod 40. The radius rod 40 moves the radius blade 33 through the connecting head 32 and imparts a slight vibratory movement to the upper end of the floating lever 29. The lever 29 moves the head 27 longitudinally upon the guide-rod 28 and operates the valve-rod 26.

Referring to Fig. 1 it will be noted that the hanger 36 is raised to draw the sliding block 33ᵃ into the extreme upper end of the arcuate slot of the link 31. In this position, the valves 25 and 25ᵃ are moved so as to partially close the inlet port and advance the lead of the valves.

In Fig. 2 the hanger is moved down to hold the block 33ᵃ in the lower end of the link 31 so as to position the valves "line in line" or to completely close the inlet port 24. In this instance the lead of the valves is retarded and the exhaust port 23 is disclosed as being slightly open. It is readily seen that the hanger 36 may be adjusted into various vertical positions by means of the hand-lever 38 and the quadrant 39 to advance or retreat the valves 25 and 25ᵃ within the steam-chest 22 to increase or decrease the lead of the same.

It is believed that this attachment greatly increases the efficiency of this form of valve-gear, as the distribution of the steam can be regulated relative to the speed and power required of the engine.

Referring to Fig. 3 of the drawings in which is disclosed a slight modification of the device, the numeral 10ᵃ designates a cylinder having a steam-chest 22ᵃ at one side thereof and communicating with the cylinder 10ᵃ through the ports 23ᵃ and 24ᵃ. A D-slide valve 25ᵇ is arranged within the steam-chest 22ᵃ for controlling the passage of steam to the ports 23ᵃ and 24ᵃ. A valve-rod 26ᵃ extends from the valve 25ᵇ through the steam-chest 22ᵃ and has connection to a head 27ᵃ slidably disposed upon a guide-rod 28ᵃ. A floating lever 29ᵃ depends in hinged relation from the head 27ᵃ and is provided adjacent to its opposite end with an open arcuate link 31ᵃ. A connecting head 32ᵃ is slidably mounted upon the outer end of the guide-rod 28ᵃ and carries a hinged radius blade 33ᶜ pivotally attached at its outer end upon a sliding block 33ᵇ mounted for sliding engagement in the open link 31ᵃ. A hanger 36ᵃ is attached to the radius blade 33ᶜ at its lower end and is carried upon an inverted bell-crank lever 35ᵃ adapted to raise and lower the hanger 36ᵃ. The lower end of the floating lever 29ᵃ is attached to the cross-head 15ᵃ by a connecting link 44ᵃ. The adjustment of this modified form of the device is practically similar to the preferred form, the difference simply residing in the specific arrangement of the arcuate open link on the floating lever and of the attachment thereto.

Having thus described the invention what is claimed as new is:—

1. In a valve gear a floating lever having an open link at one end, a valve rod pivotally connected relative to said link, an outer head movable toward and away from said lever, a block slidable in the link of said lever, a radius blade pivoted respectively to said outer head and the block of said floating lever link, a reversing link swingingly supported, a block slidable in said reversing link, another radius blade pivoted to said reversing link block and to said outer head, and independent means for adjusting said radius blades.

2. In a valve gear a guide rod, an inner head slidable upon said rod, a valve rod connected to said inner head, a floating lever including an arcuate link swinging upon said inner head, means adapted to connect said lever for movement by the cross head of an engine, an outer head slidable upon said rod, a block slidable in the arcuate link of said floating lever, a radius blade pivoted respectively to said floating lever link block and to said outer head, a crank operative by the crank shaft of an engine, a reversing link, a rod pivoted respectively to said reversing link and to said crank, a block slidable in said reversing link, a radius blade pivoted respectively to said reversing link block and to said outer head, and independent means for adjusting said link blocks.

In testimony whereof, I affix my signature in presence of two witnesses.

RICHARD M. WIGGINS. [L. S.]

Witnesses:
 ALVINA L. KEITH,
 E. R. SHEETZ.